Sept. 20, 1932.  A. B. DE COSSE  1,878,115
HYDRAULIC LUBRICATING SYSTEM
Filed April 12, 1928  2 Sheets-Sheet 1
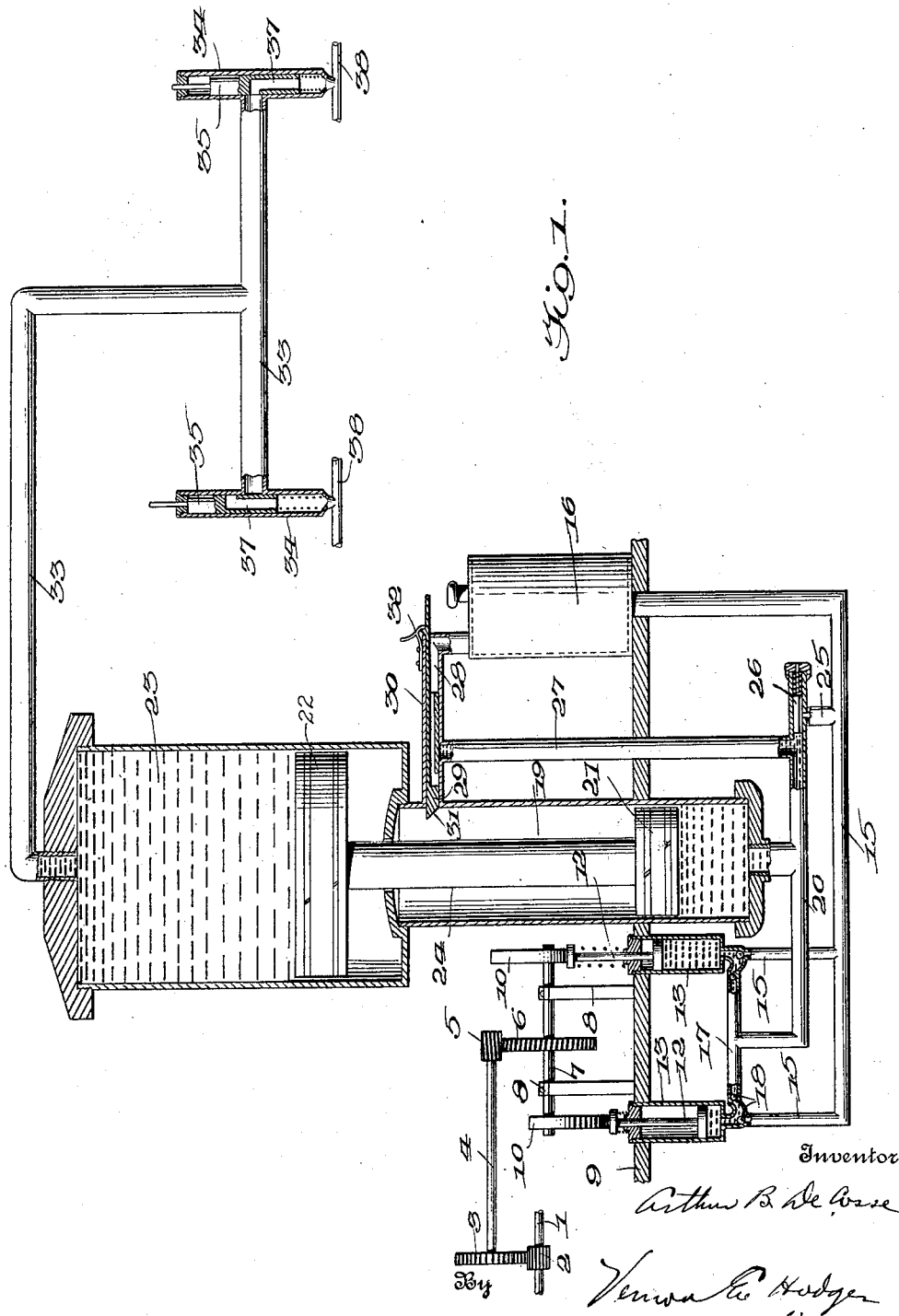

Sept. 20, 1932.  A. B. DE COSSE  1,878,115
HYDRAULIC LUBRICATING SYSTEM
Filed April 12, 1928  2 Sheets-Sheet 2
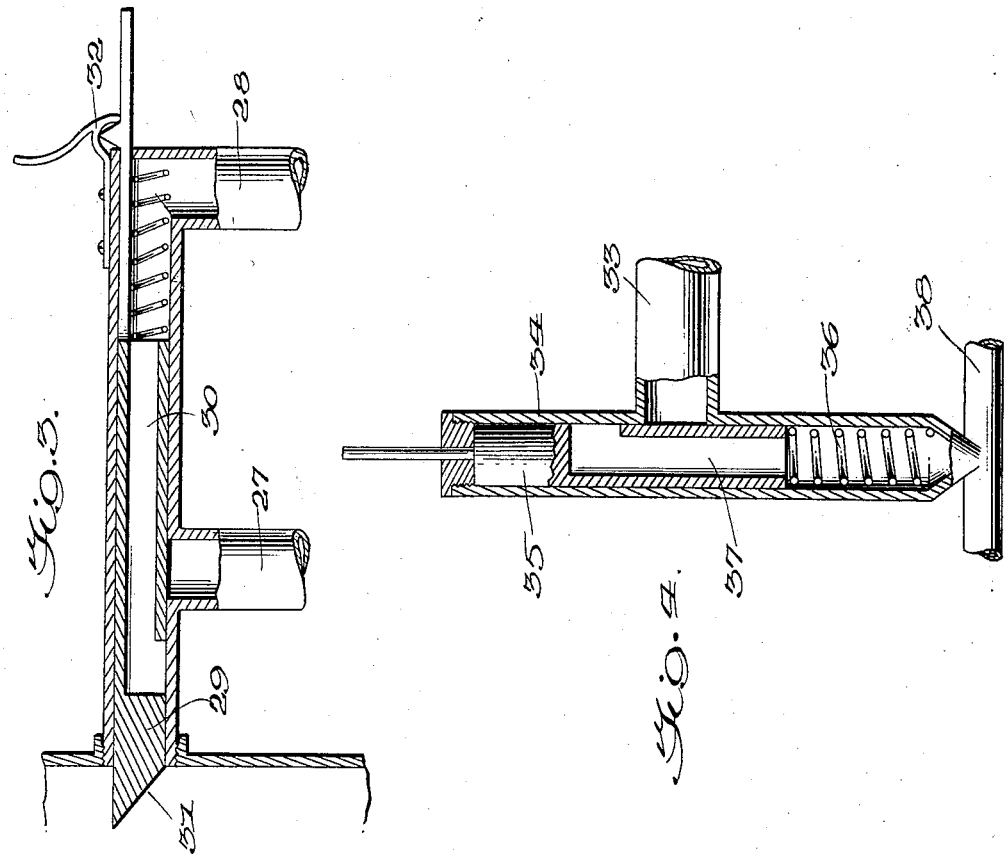
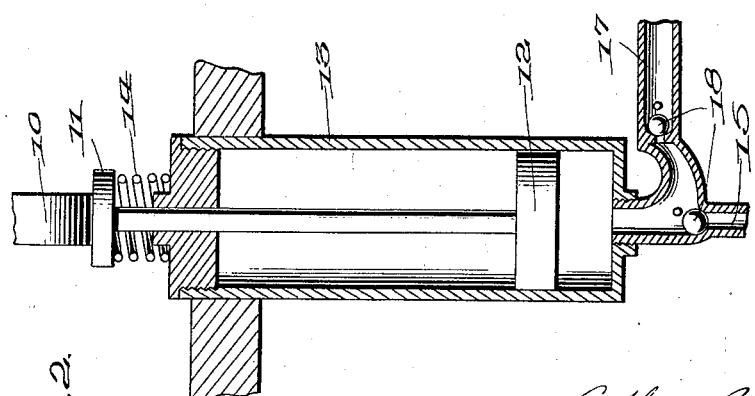

Patented Sept. 20, 1932

1,878,115

UNITED STATES PATENT OFFICE

ARTHUR B. DE COSSE, OF MILES CITY, MONTANA

HYDRAULIC LUBRICATING SYSTEM

Application filed April 12, 1928. Serial No. 269,383.

This invention relates to an improvement in hydraulic lubricating systems.

The object of the invention is to provide a simple manner of lubricating the bearings of large machinery within a very short time and without losing a great deal of time which is usually required in the greasing of such machinery.

With this invention, a savings of about five-sixths of the time usually required is attained and the operation is very much simpler and easier to accomplish.

The invention resides in the manner of forcing the lubricant to the bearings by hydraulic means, which may be applied to the source of lubricant for this purpose. The structure is simple and easy in operation but suitable regulating valves are provided to regulate the distribution of the lubricant to the bearings.

In the accompanying drawings:

Fig. 1 is a side elevation partly in section showing the invention in use;

Fig. 2 is a sectional view illustrating one of the hydraulic pumps;

Fig. 3 is a similar view of the compression release valve; and

Fig. 4 is a sectional view of the lubricant control valve.

The invention may be applied to almost any kind or type of machine which has operating and moving parts requiring lubrication. The invention is illustrated in connection with an engine which is provided with the magneto shaft 1 upon which a pinion 2 meshes with a gear 3 mounted on a drive shaft 4, so as to cause a rotation of such shaft upon the rotation of the shaft 1. A worm 5 on the drive shaft 4 meshes with a worm gear 6 fixed on a cam shaft 7 mounted in the bearings 8 upon the floor or other stationary part 9. Cams 10 are fixed on the cam shaft 7 in position to engage the heads 11 of plungers 12, which are slidably mounted in casings 13, springs 14 being interposed between the upper ends of the casings and the heads 11 of the plungers, so as to normally tend to hold the heads of the plungers in engagement with the cams 10.

The plungers 12 and casings 13 constitute two hydraulic pumps which communicate through the pipes 15 with a source of liquid supply, such as a tank 16. The lower ends of the pumps communicate with each other through a pipe 17. Check valves 18 are provided in the pipes 15 and 17 to allow the liquid to flow in only one direction but to check backflow to the tank and pumps. A cylinder 19 is associated with the pumps and communicates with the pipe 17 through a pipe 20. This cylinder 19 has a piston 21 operatively mounted therein and connected with a piston 22 in a grease chamber 23 by means of a connecting rod 24.

The pistons 21 and 22 are rigidly connected together so that they operate simultaneously. The pipe 20 communicates with the pipe 15 through a branch pipe 25, this communication being regulated by a safety valve 26 which may also regulate the pressure in the pipes and the chamber 19. The pipe 20 also has a pipe 27 connected therewith and which is connected at its upper end with a branch pipe 28 leading back to the tank 16. A valve 29, shown in detail in Fig. 3, has an opening 30 therethrough which is adapted to communicate with the pipe 27 whenever the piston 21 as moved upward in the cylinder 19 to such an extent that it engages the inclined inner end 31 of the valve 29, causing a backward movement of this valve to establish communication between the pipe 27 and the opening 30, which in turn communicates with the branch pipe 28 leading to the tank 16. A spring catch 32 holds the valve 29 in an extreme position.

The grease chamber 23 has a distributing pipe 33 connected therewith, which distributing pipe communicates with regulating valves 34 shown in Fig. 4, each of which is provided with a plunger 35 normally pressed upwardly by a coil spring 36 but having an opening 37 therethrough adapted to be placed in communication with the pipe 33 whenever the plunger is depressed for establishing communication between the pipe 33 and the grease boxing 38, to which the grease is supplied for lubricating purposes.

The operation of the invention is simple and approximately continuous. The running of the machine or engine causes a turning of the magneto-shaft 1 which, through the gearing and shafts, causes a rotation of the cam shaft 7 and the cams 10, which intermittently depresses the plungers 12. One of the plungers is depressed when the other is elevated by the spring 14. Upon the elevation of each plunger, it draws a certain amount of the oil or liquid from the tank 16 through the pipes 15 up into the cylinder 13, this liquid being trapped by the check valves 18, and upon the depression of the plunger the liquid is forced through the pipes 17 and 20 into the compression cylinder 19, where it acts upon the piston 21 tending to move said piston upwardly, which likewise causes a movement of the piston 22 in the grease chamber 23, forcing the grease from said chamber through the pipes 33 to the valves 34.

Whenever the plungers 35 are depressed to establish communication to the openings 37 between the pipes 33 and grease boxing 38, the grease is allowed to flow from the pipes 33 and lubricate the moving parts of the machine.

Whenever the piston 21 has moved upward near the upper end of the chamber 19, it engages the inclined inner end 31 of the valve 29, causing a backward movement of said valve and establishing communication from the pipe 27 through the opening 30 to the pipe 28, which releases the pressure in the chamber 19 and allows the liquid to flow back into the tank 16. This allows the pistons to drop back to their initial positions, and the grease chamber 23 may then be refilled for a regreasing of the machinery, after which the spring catch 32 may be released and the valve 29 moved into the position shown in Fig. 3, which cuts off communication between the pipe 27 and the source of supply or tank 16.

The invention may utilize oil or other liquid or fluid for applying hydraulic pressure to the piston 21 for the lubricating operation. The shaft 4 may be driven from any moving part of the engine or other source of power, if desired, instead of the magneto-shaft 1.

The invention is extremely simple in construction and accomplishes the lubricating operation in only about one-sixth of the time usually required and allows a complete lubricating of the working parts of the machine or engine while the latter is in operation.

I claim:—

1. A lubricating system including a grease chamber, a piston mounted therein, a compression chamber associated with the grease chamber and having a piston therein connected with the first-mentioned piston, a source of fluid supply adapted to communicate with the compression chamber, and a pump for drawing the fluid from the source of supply and forcing the same under pressure into the compression chamber, the compression chamber being adapted to communicate with the source of fluid supply, and means for establishing said communication operated by the second mentioned piston when the latter reaches a predetermined position in the compression chamber.

2. A lubricating system including a grease chamber, lubricating pipes extending therefrom to bearings, valves for regulating the communication of said pipes with the bearings, a piston mounted in the grease chamber for forcing the lubricant therefrom, and compression chamber associated with the grease chamber, a second piston mounted in the compression chamber and connected with the first mentioned piston, a source of liquid supply, pipes connecting the source of liquid supply with the compression chamber, pumps communicating with said pipes for withdrawing the liquid from the source of supply and forcing the same under pressure into the compression chamber, said pumps having spring pressed pistons mounted therein, cams for operating said pistons, and check valves in the pipes to prevent back-flow of the liquid.

3. A lubricating system including a grease chamber, lubricating pipes extending therefrom to bearings, valves for regulating the communication of said pipes with the bearings, a piston mounted in the grease chamber for forcing the lubricant therefrom, and compression chamber associated with the grease chamber, a second piston mounted in the compression chamber and connected with the first mentioned piston, a source of liquid supply, pipes connecting the source of liquid supply with the compression chamber, pumps communicating with said pipes for withdrawing the liquid from the source of supply and forcing the same under pressure into the compression chamber, said pumps having spring pressed pistons mounted therein, cams for operating said pistons, and check valves in the pipes to prevent backflow of the liquid, pipes connecting the compression chambers with a source of liquid supply, and a valve for establishing communication through the last mentioned pipes, said valve having an inclined inner end projecting into the compression chamber in position to be engaged by the second piston when said piston has reached a predetermined position in its movement in the compression for causing an opening of said valve.

4. A lubricating system including a lubricant chamber, a piston for forcing the lubricant therefrom, a source of fluid supply adapted to communicate with and act on said piston, and a valve having a portion thereof protruding into the path of the piston to be engaged thereby on its outward movement for causing a by-pass of the fluid back to the source of supply.

5. A lubricating system comprising a lubricant chamber, a piston for forcing the lubricant therefrom, a source of fluid pressure acting on the piston to discharge the lubricant, and means for automatically causing a by-passing of the fluid to the source of supply to reduce the pressure on the piston when the piston reaches a predetermined position.

6. A lubricating system comprising a lubricant chamber, a piston for forcing the lubricant thereform, a source of fluid supply adapted to act on the piston, and means for automatically causing a by-passing of the fluid back to the source of supply when the piston reaches a predetermined position.

7. A lubricating system comprising a lubricant chamber, a piston for forcing the lubricant therefrom, a compression chamber to cause action on said piston, a source of fluid supply, a plurality of pumps connected with and receiving fluid from said source of fluid supply, means connecting said pumps with the compression chamber, and one-way valves disposed in said connections and actuated by the passage of fluid therethrough.

8. In a lubricating system, a lubricant supply pipe, a discharge connection therefor, a plunger slidably mounted in said connection and having an orifice therein adapted to be manually brought into communication with the supply pipe, a spring normally tending to force the plunger outward, and a stem connected with the plunger for actuating the same against the tension of the spring.

9. A lubricating system comprising a lubricant chamber, a piston for forcing the lubricant therefrom, a source of fluid pressure supply acting upon the piston to discharge the lubricant, means for automatically causing a by-passing of the fluid back to the source of supply to reduce the pressure on the piston, and means for maintaining said reduced pressure while the lubricant chamber is refilled.

10. A lubricating system comprising a lubricant chamber, a piston for forcing the lubricant therefrom, a source of fluid pressure supply acting upon the piston to discharge the lubricant, means for automatically causing a by-passing of the fluid back to the source of supply to reduce the pressure on the piston when the lubricant is exhausted within the lubricant chamber, and means for maintaining reduced pressure against the piston while the lubricating chamber is refilled.

In testimony whereof I affix my signature.

ARTHUR B. DE COSSE.